(12) United States Patent
Lee et al.

(10) Patent No.: US 12,434,595 B2
(45) Date of Patent: Oct. 7, 2025

(54) SYSTEM AND METHOD FOR BATTERY CONDITIONING OF VEHICLE

(71) Applicants: Hyundai Motor Company, Seoul (KR); Kia Corporation, Seoul (KR)

(72) Inventors: Joong Woo Lee, Yongin-si (KR); Hyun Soo Park, Seoul (KR); Dea Ki Cheong, Yongin-si (KR); Tae Hyuck Kim, Seoul (KR); Tae Geun Jeong, Seoul (KR); Dae Kyung Kim, Seoul (KR); Dae Gun Jin, Gyeonggi-do (KR); In Seok Park, Seoul (KR); Jin Gyu Lim, Seoul (KR); Seung Myun Chung, Gumi-si (KR); Ki Seung Baek, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 437 days.

(21) Appl. No.: 17/812,344

(22) Filed: Jul. 13, 2022

(65) Prior Publication Data
US 2023/0048344 A1 Feb. 16, 2023

(30) Foreign Application Priority Data
Aug. 13, 2021 (KR) .......................... 10-2021-0107664

(51) Int. Cl.
*B60L 58/12* (2019.01)
*B60L 53/10* (2019.01)
(Continued)

(52) U.S. Cl.
CPC ............... *B60L 58/12* (2019.02); *B60L 58/27* (2019.02); *B60H 1/00278* (2013.01);
(Continued)

(58) Field of Classification Search
CPC .... B60L 58/12; B60L 58/27; B60L 2240/545; B60L 2240/622; B60L 2240/662;
(Continued)

(56) References Cited

U.S. PATENT DOCUMENTS

2010/0324765 A1* 12/2010 Iida ..................... B60L 15/2045
701/22
2012/0280050 A1* 11/2012 Tonozuka ............. B60L 3/0046
236/94
(Continued)

FOREIGN PATENT DOCUMENTS

KR          10-1519780 B1      5/2015
KR     10-2015-0075788 A      7/2015
(Continued)

OTHER PUBLICATIONS

Blanco et al. ("EV Charging Stations: Where to Find Them, What Type You Need, How to Pay." Car and Driver, Dec. 3, 2019, www.caranddriver.com/news/a30031153/ev-charging-guide/.) (Year: 2019).*

(Continued)

*Primary Examiner* — Lisa M Caputo
*Assistant Examiner* — Christian T Bryant
(74) *Attorney, Agent, or Firm* — Fox Rothschild LLP (57) ABSTRACT

In one aspect, a system and method for battery conditioning of a vehicle are disclosed. The system comprises receivers configured to collect driving route information of the vehicle, battery state information of the vehicle and battery conditioning mode setup state information, and a controller configured to determine whether or not the vehicle enters battery conditioning control based on the driving route information of the vehicle, the battery state information of the vehicle and the battery conditioning mode setup state information received from the receivers and to control a (Continued)

battery temperature adjuster so as to adjust a temperature of the battery in advance before charging the battery during the battery conditioning control.

14 Claims, 6 Drawing Sheets

(51) Int. Cl.
  *B60L 58/24* (2019.01)
  *B60L 58/26* (2019.01)
  *B60L 58/27* (2019.01)
  *B60H 1/00* (2006.01)
(52) U.S. Cl.
  CPC ............... *B60L 53/11* (2019.02); *B60L 58/24* (2019.02); *B60L 58/26* (2019.02); *B60L 2240/545* (2013.01); *B60L 2240/622* (2013.01); *B60L 2240/662* (2013.01); *B60L 2260/50* (2013.01); *B60L 2260/56* (2013.01); *B60Y 2200/91* (2013.01); *B60Y 2200/92* (2013.01); *Y02T 10/62* (2013.01); *Y02T 10/70* (2013.01); *Y02T 10/7072* (2013.01); *Y02T 90/12* (2013.01)
(58) Field of Classification Search
  CPC .. B60L 2260/50; B60L 2260/56; B60L 58/26; B60L 58/24; B60L 53/11; Y02T 10/70; Y02T 10/62; Y02T 10/7072; Y02T 90/12; B60H 1/00278; B60Y 2200/91; B60Y 2200/92

See application file for complete search history.

(56) References Cited

U.S. PATENT DOCUMENTS

| | | | |
|---|---|---|---|
| 2013/0052490 | A1 | 2/2013 | TenHouten et al. |
| 2015/0266392 | A1* | 9/2015 | Arai ................... B60H 1/00921 320/150 |
| 2018/0304765 | A1* | 10/2018 | Newman ................. B60L 58/26 |
| 2020/0231023 | A1* | 7/2020 | Sathasivam ......... H01M 10/633 |
| 2021/0031654 | A1 | 2/2021 | Vizzini et al. |
| 2021/0229570 | A1 | 7/2021 | Futter |
| 2022/0185135 | A1* | 6/2022 | Langton ................. B60L 58/12 |
| 2022/0250506 | A1* | 8/2022 | Goldman-Shenhar ...................... G01C 21/3469 |

FOREIGN PATENT DOCUMENTS

| | | |
|---|---|---|
| KR | 10-2023-0024136 A | 2/2023 |
| KR | 10-2023-0025608 A | 2/2023 |

OTHER PUBLICATIONS

Extended European Search Report issued Dec. 15, 2022 in European Patent Application No. 22184837.7.

\* cited by examiner

SYSTEM AND METHOD FOR BATTERY CONDITIONING OF VEHICLE

CROSS-REFERENCE TO RELATED APPLICATION

This application claims, under 35 U.S.C. § 119(a), the benefit of Korean Patent Application No. 10-2021-0107664, filed on Aug. 13, 2021, in the Korean Intellectual Property Office, the entire disclosure of which is incorporated herein by reference.

BACKGROUND OF THE DISCLOSURE

Field of the Disclosure

The present disclosure relates to a system and method for battery conditioning of a vehicle, and more particularly, to a system and method for battery conditioning of a vehicle which may greatly shorten the actual charging time of the battery by raising the temperature of the battery to the optimum temperature or cooling the battery in advance before charging the battery through interworking among GPS information received by the vehicle, driving information and information on the state of the battery.

Background

Recently, as supply of electric vehicles and plug-in hybrid vehicles is rapidly increased, a battery charging time, which is one of obstacles to vehicle operation, is very important. In general, the charging time of a lithium ion battery mounted in a vehicle varies depending on whether or not the battery is battery heated. When the battery reaches a temperature at which the maximum charging efficiency of the battery may be achieved, by battery heating, i.e., battery conditioning, the battery, the charging time of the battery during quick charging of the battery of the vehicle is drastically reduced.

Conventionally, as a method for raising the temperature of a battery of a vehicle, there is a winter mode function executed to secure the driving performance of the vehicle at a low temperature. This function is essential in driving the vehicle when an external temperature is extremely low, and is different from securing of charging performance of the battery, such as shortening of the charging time of the battery during quick charging of the battery. Since the interior of vehicle is hotter in summer and is colder in winter, the battery mounted in the vehicle cannot help being affected by the external temperature. Therefore, GPS interworking control refers to control of the battery in which the temperature thereof is raised before charging the battery in the manner of interworking GPS information received by the vehicle so as to provide user convenience, and in order to improve charging performance of the battery due to matching of the optimum temperature at all times, a strategy to raise the temperature of the battery so as to execute the battery conditioning function is on the rise.

The above information disclosed in the Background section is only for enhancement of understanding of the background of the disclosure and should not be interpreted as conventional technology that is already known to those skilled in the art.

SUMMARY OF THE DISCLOSURE

Accordingly, the present disclosure has been made in view of the above problems, and one aspect of the present disclosure is to provide a system for battery conditioning of a vehicle, which executes a battery temperature raising function or a battery cooling function a designated time before the vehicle arrives at a charging station in consideration of predicted arrival time information to the charging station through a navigation system of the vehicle and factors, such as the temperature of the battery, a temperature outside the vehicle, etc., so as to maximize charging performance of the battery and to greatly shorten the charging time of the battery.

In accordance with an aspect of the present disclosure, the above and other aspects may be accomplished by the provision of a system for battery conditioning of a vehicle, where the system comprises receivers configured to collect driving route information of the vehicle, battery state information of the vehicle and battery conditioning mode setup state information; and a controller configured to determine whether or not the vehicle enters battery conditioning control based on the driving route information of the vehicle, the battery state information of the vehicle and the battery conditioning mode setup state information received from the receivers and to control a battery temperature adjuster so as to adjust a temperature of the battery in advance before charging the battery during the battery conditioning control.

The driving route information may comprise a destination, a stopover or a moving path set in the vehicle, and the controller may determine that the vehicle is capable of entering the battery conditioning control when the destination, the stopover or the moving path set in the vehicle comprises a charging station.

The controller may determine that the vehicle is capable of entering the battery conditioning control when a destination, a stopover or a moving path set in the vehicle comprises a charging station and it is determined that a quick charger is provided in the corresponding charging station.

The controller may receive information as to whether or not the quick charger is provided in the corresponding battery station from a memory of the vehicle or an external information provider directly or through the receivers.

The battery state information may comprise a temperature of the battery and a state of charge (SOC) of the battery, and the controller may determine that the vehicle is capable of entering the battery conditioning control when the temperature of the battery deviates from a set temperature and the SOC of the battery is equal to or greater than an SOC of the battery necessary to drive the vehicle and to operate the battery temperature adjuster.

When the vehicle enters the battery conditioning control, the controller may calculate a predicted point in time when the vehicle starts to charge the battery and a necessary operating time of the battery temperature adjuster, and may start to execute battery conditioning control of the battery at a point in time calculated by subtracting the necessary operating time from the predicted point in time.

The necessary operating time may be a time taken for the battery to reach a set temperature by operating the battery temperature adjuster.

The controller may adjust operation of the battery temperature adjuster so that the battery maintains a set temperature when a temperature of the battery reaches the set temperature before the battery is charged after starting to execute the battery conditioning control of the battery.

The battery temperature adjuster may be a battery heater configured to raise the temperature of the battery.

In accordance with another aspect of the present disclosure, there is provided a method for battery conditioning of a vehicle, where the method comprises collecting, by receivers, driving route information of the vehicle, battery state information of the vehicle and battery conditioning mode setup state information; determining, by a controller, whether or not the vehicle enters battery conditioning control based on the driving route information of the vehicle, the battery state information of the vehicle and the battery conditioning mode setup state information; and adjusting, by the controller, a temperature of the battery in advance before charging the battery, by controlling a battery temperature adjuster during the battery conditioning control.

The driving route information may comprise a destination, a stopover or a moving path set in the vehicle, and, in the step of determining whether or not the vehicle enters the battery conditioning control, the controller may determine that the vehicle is capable of entering the battery conditioning control when the destination, the stopover or the moving path set in the vehicle comprises a charging station.

In determining whether or not the vehicle enters the battery conditioning control, the controller may determine that the vehicle is capable of entering the battery conditioning control when a destination, a stopover or a moving path set in the vehicle comprises a charging station and it is determined that a quick charger is provided in the corresponding charging station.

The battery state information may comprise a temperature of the battery and a state of charge (SOC) of the battery, and, in the step of determining whether or not the vehicle enters the battery conditioning control, the controller may determine that the vehicle is capable of entering the battery conditioning control when the temperature of the battery deviates from a set temperature and the SOC of the battery is equal to or greater than an SOC of the battery necessary to drive the vehicle and to operate the battery temperature adjuster.

In the step of adjusting the temperature of the battery in advance, the controller, when the vehicle enters the battery conditioning control, may calculate a predicted point in time when the vehicle starts to charge the battery and a necessary operating time of the battery temperature adjuster, and may start to execute battery conditioning control of the battery at a point in time calculated by subtracting the necessary operating time from the predicted point in time.

In accordance with yet another aspect of the present disclosure, there is provided a non-transitory computer readable recording medium having stored therein at least one program configured to be executed by at least one processor, wherein the at least one program comprises commands configured to determine whether or not the vehicle enters battery conditioning control based on driving route information of the vehicle, battery state information of the vehicle and battery conditioning mode setup state information, received by receivers of the vehicle, and to control a battery temperature adjuster so as to adjust a temperature of the battery in advance before charging the battery during the battery conditioning control.

In another aspect, a vehicle is provided that comprises a system for battery conditioning of a vehicle as disclosed herein.

Other aspects are disclosed infra.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller, or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some exemplary embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Specific structural or functional descriptions in embodiments of the present disclosure set forth in the description which follows will be exemplarily given to describe the exemplary embodiments of the present disclosure, but the present disclosure may be embodied in many alternative forms, and should not be construed as being limited to the embodiments set forth herein. Hereinafter, reference will be made in detail to the exemplary embodiments of the present disclosure, examples of which are illustrated in the accompanying exemplary drawings.

Figure 1:
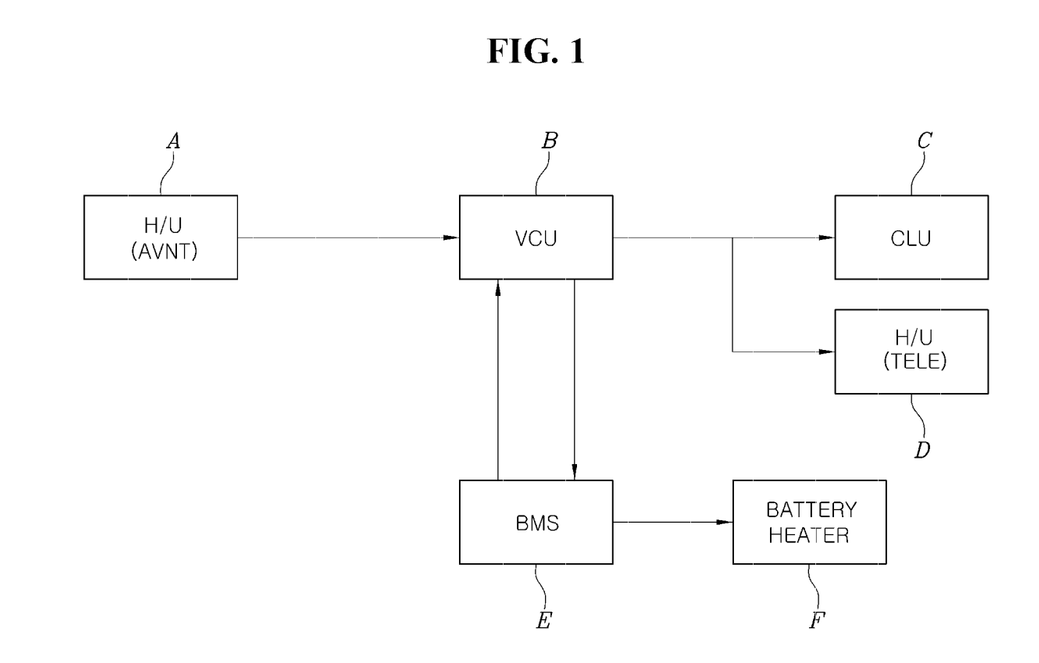
FIG. 1 is a block diagram illustrating a system for battery conditioning of a vehicle according to one exemplary embodiment of the present disclosure.

FIG. 1 is a block diagram illustrating a system for battery conditioning of a vehicle according to one exemplary embodiment of the present disclosure. FIGS. 2 to 5 are views illustrating examples of setting screens displayed on an AVN system and a communication terminal in the system according to one exemplary embodiment of the present disclosure. FIG. 6 is a flowchart representing a method for battery conditioning of a vehicle according to one exemplary embodiment of the present disclosure.

FIG. 1 is a block diagram illustrating a system for battery conditioning of a vehicle according to one exemplary embodiment of the present disclosure. The system according to one exemplary embodiment of the present disclosure comprises receivers A and E configured to collect driving route information of the vehicle, battery state information of the vehicle and battery conditioning mode setup state information; and a controller B configured to determine whether or not the vehicle enters battery conditioning control based on the driving route information of the vehicle, the battery state information of the vehicle and the battery conditioning mode setup state information from the receivers A and E, and to control a battery temperature adjuster F so as to adjust the temperature of the battery in advance before charging the battery during the battery conditioning control.

The present disclosure is applied to all kinds of vehicles which travel using a driving motor through electrical energy from a high voltage battery mounted therein, such as electric vehicles, hybrid vehicles, fuel cell vehicles, etc.

In such a vehicle, the high voltage battery of the vehicle is capable of being directly charged in a charging station, and the present disclosure may greatly shorten the charging time of the battery and improve the charging environment of the battery so as to improve durability of the battery and to secure the maximum charge amount of the battery.

The present disclosure executes a battery temperature raising function or a battery cooling function a designated time before the vehicle arrives at a charging station so as to maximize charging performance of the battery, and greatly shortens the charging time of the battery so as to improve the marketability of the vehicle. Such proactive air-conditioning of the battery is defined as battery conditioning.

In the present disclosure, it may be determined whether or not the battery conditioning entry condition information of the battery and the battery conditioning execution settings of the battery in the vehicle are received, and battery conditioning may be executed based on results of determination. As a conventional method for raising the temperature of a battery, a winter mode was executed. However, the winter mode corresponds to fail-safe concept control in which the battery is artificially heated so as to secure the minimum performance of the vehicle in extremely low temperature environments, and battery conditioning according to the present disclosure is selectively executed before charging the battery so as to shorten the charging time of the battery during quick charging of the battery, and thus has a concept completely different from the winter mode in terms of an object of control or a process and effects.

In general, in order to secure charging performance of a battery, the battery must secure a constant temperature, but it takes a lot of energy to maintain the optimum battery temperature at all times. Therefore, various methods for raising the temperature of a battery are being developed. Since the interior of vehicle is hotter in summer and is colder in winter, the battery mounted in the vehicle cannot help being affected by the external temperature. Therefore, GPS interworking control in consideration of the external temperature or season is more effective, and in order to improve charging performance of the battery due to reaching of the optimum temperature of the battery in advance before charging the battery, a strategy to raise the temperature of the battery so as to execute the battery conditioning function of the battery needs to be devised.

The present disclosure is to adjust the temperature of a high voltage battery of a vehicle in advance before charging the battery. In general, an external temperature is low in winter and thus the temperature of the battery may be very low, and the external temperature is high in summer and thus the temperature of the battery may be very high under the same driving conditions. The charging efficiency of the battery varies depending on the temperature of the battery, particularly during quick charging of the battery, and therefore, the charging efficiency of the battery may be raised by raising the temperature of the battery or cooling the battery in advance before charging the battery in a standard charging manner or in a quick charging manner in consideration of season, the external temperature or the temperature of the battery.

Thereamong, when the battery is quickly charged in the extremely low temperature state of the battery, the charging efficiency and the charging time of the battery greatly vary, and thus, the present disclosure applied to this case is very effective. Therefore, as a representative example of the present disclosure, battery conditioning in which the temperature of the battery is raised to a set temperature in advance before quickly charging the battery when the temperature of the battery is very low will be described below. Of course, during cooling of the battery, the battery may also be cooled to a set temperature in advance using the battery temperature adjuster.

Further, when there is a great gap between the current temperature and the set temperature of the battery, energy efficiency may be increased by heating the battery using large energy in the early stage and then heating the battery under a mild operating condition. Otherwise, in addition to a heater configured to directly heat the battery, a heat pump system of a vehicle air conditioner may be used as the temperature adjuster so as to maximize energy efficiency.

Figure 4:
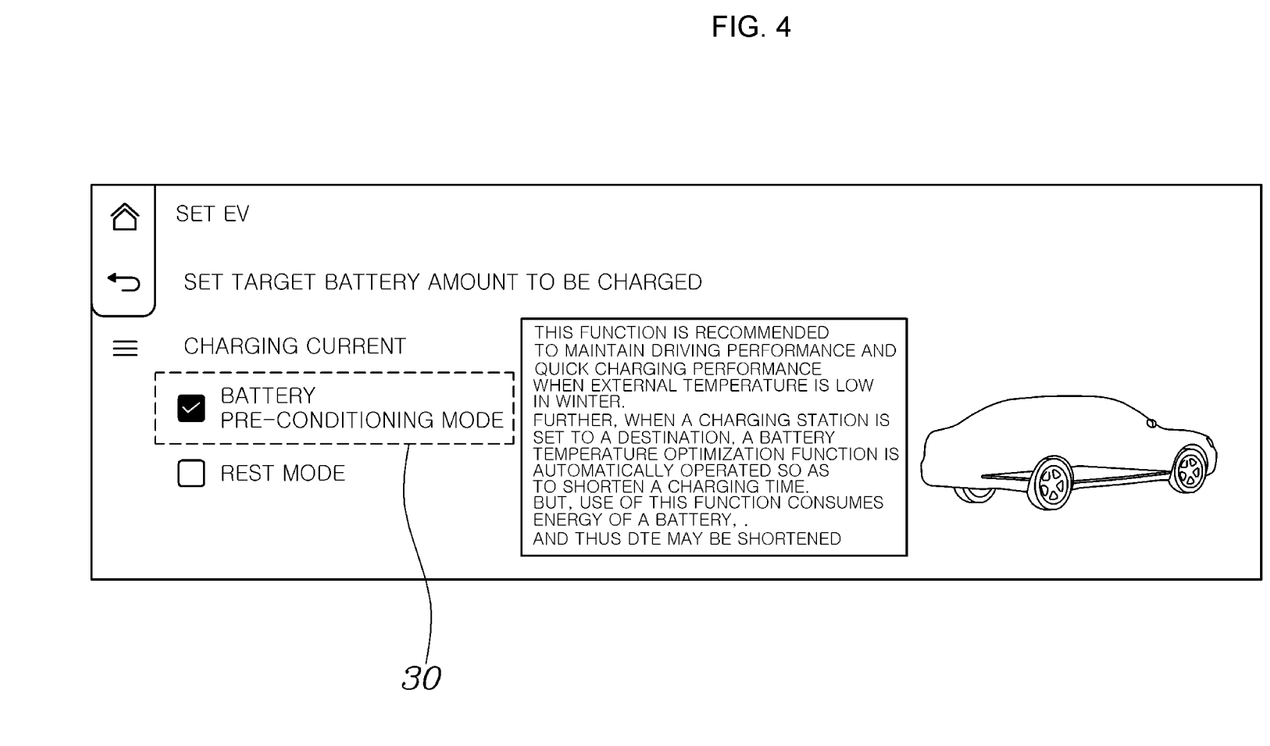

In the present disclosure, a strategy to raise the temperature of the battery in which it is determined whether or not the battery conditioning entry condition information of the battery and the battery conditioning execution settings of the battery in the vehicle are received, and battery conditioning is executed based on results of determination, is proposed. Thereby, it is possible to control the battery to raise the temperature thereof through interworking with GPS information received by the vehicle. Further, since the battery conditioning entry condition information is received, charging performance of the battery may be maximized through the battery temperature raising function executed a designated time before the vehicle arrives at a charging station, and the marketability of the vehicle may be improved due to shortening of the charging time of the battery. Further, when the corresponding function is operated, the operating state of the function is displayed on an application 40 of a user's smartphone, as shown in FIG. 4, and thus, the user may easily confirm whether or not corresponding GPS interworking control is normally operated.

Battery conditioning must be started a designated time before a point in time when the battery is charged, and such a point in time when the battery is charged may be a point in time when the vehicle arrives at a charging state or a point in time when the user reserves charging of the vehicle, or may be a point in time when the vehicle starts to charge the battery thereof in consideration of a waiting time if there is no charging slot left for the vehicle in the charging station.

Concretely, a navigation system receives a destination input by the user, and the receivers A and E receives the battery state information and in-vehicle battery conditioning mode setup state information. Further the controller B determines control entry conditions based on the driving route information of the vehicle, the battery state information and the in-vehicle battery conditioning mode setup state information so as to control the temperature of the battery.

Referring to FIG. 1, an audio, video, navigation and telematics (AVNT) system A in a head unit H/U indicates a multi-infotainment system of the vehicle. The controller B is a vehicle control unit (VCU) which sets ON or OFF of a battery conditioning mode based on the information received from the AVNT system A in the head unit H/U. Here, when the battery conditioning mode is not set to ON, the battery conditioning control to raise the temperature of the battery is not executed. That is, the controller B, i.e., the VCU, controls the temperature of the battery based on the driving route information, the battery state information and the in-vehicle battery conditioning mode setup state information, corresponding to the control entry conditions, received from the AVNT system A in the head unit H/U.

Further, a battery management system (BMS) E transmits the state of the battery to the controller B, i.e., the VCU B, and the VCU B receives the operating state of a battery heater F, the current temperature of the battery, the state of charge (SOC) of the battery, etc. from the BMS E. The VCU B, corresponding to the controller, controls ON/OFF and the operating amount of the battery heater F for battery conditioning based on the battery conditioning mode setup state information, the positions of charging stations, residual driving times and residual distances up to the charging stations, charging specification type information, received from the AVNT system A in the head unit H/U, and the operating state of the battery heater F, the current temperature of the battery and the current SOC of the battery, received from the BMS E.

Further, the VCU B transmits the charging station entry condition information of the vehicle and a battery conditioning execution state signal to the user's smartphone through a cluster (CLU) and a communication terminal D of the head unit, so as to display the entry condition information and the battery conditioning execution state of the battery to the user as visual information.

The driving route information of the vehicle may comprise information to determine whether or not a destination or a stopover input by the user is a quick charging station. In the case of standard charging, a charging time is sufficient and thus the effects of battery conditioning may be small, and in the case of quick charging, a charging time may be very greatly reduced through battery conditioning.

The controller B may receive information as to whether or not a quick charger is provided in the corresponding battery station from the memory of the vehicle or an external information provider directly or through the receivers A and E. Information about charging stations may be stored in connection with map information in the memory of the vehicle, or may be provided through other external servers or the user's terminal.

The battery state information may comprise battery temperature information and battery state of charge (SOC) information.

When the vehicle receives and recognizes the driving route information, the battery state information and the in-vehicle battery conditioning mode setup state from the receivers A and E during driving or parking before charging the battery of the vehicle in a charging station, the vehicle may give the user a choice to determine whether or to raise the temperature of the battery so that the battery of the vehicle may be charged in the charging station through the cluster C or the communication terminal D. When the vehicle outputs the battery conditioning execution state signal and the temperature of the battery is raised in advance during driving, charging performance of the battery of the vehicle may be further maximized when the vehicle arrives at the charging station and the battery of the vehicle is charged. The battery state information indicates that it is determined whether or not the temperature of the battery corresponds to a temperature at which the battery needs to be charged by determining the temperature information of the battery, and the battery SOC information indicates the rate of the charge amount of the battery of the vehicle relative to the full capacity of the battery. Thus, the temperature of the battery may be effectively controlled before the vehicle enters the charging station by accurately determining the charging station entry conditions of the vehicle.

Concretely, the controller E may determine that the vehicle is capable of entering battery conditioning control, when the temperature of the battery deviates from a set temperature and the charge amount of the battery is equal to or greater than a charge amount necessary to drive the vehicle and to operate the battery temperature adjuster F. The set temperature may be a predetermined temperature section in consideration of charging efficiency, and the controller B may determine how far the current temperature of the battery or the temperature of the battery predicted at a predicted point in time when battery conditioning is started deviates from the set temperature, and may set the operating time and the operating amount of the battery temperature adjuster F or a strategy to operate the battery temperature adjuster F based on a result of the determination. Further, since the temperature of the battery is raised during quick charging, the set temperature may vary depending on outdoor air temperature or season. For example, when the outdoor air temperature is low or in winter, the set temperature may be high so that the vehicle starts to charge the battery after the battery is sufficiently battery heated, and, in spring or fall, although the set temperature is low, the temperature of the battery may be quickly raised by charging, and therefore, the set temperature may be flexibly determined depending on such an external environment or season.

Further, in terms of the charge amount of the battery, whether or not sufficient energy is stored in the battery must be considered in consideration of energy consumed by the vehicle in reaching the charging station and energy consumed by the battery temperature adjuster F during battery conditioning. When energy stored in the battery is not sufficient, the vehicle may start to execute battery conditioning as late as possible so that the vehicle may start to charge the battery in the state in which the battery is close to the temperature condition. Further, since the temperature of the battery may be changed depending on the use state of the battery during a driving process up to the charging station, the heating scenario of the battery during the rest of the driving process may be predicted, and thereby, the point in time when the vehicle starts to execute battery conditioning and the degree of battery conditioning may be adjusted. For example, when it is predicted that high vehicle output is required on a highway during the rest of the driving process, the controller B may start to execute battery conditioning a little later.

When it is determined that the control entry conditions are not satisfied, the controller B does not start to execute battery conditioning, and may give feedback on the driving route information, the battery state information and the in-vehicle battery conditioning mode setup state information to the user.

In another exemplary embodiment, technology which sets a battery conditioning mode reflecting a user option may be applied. During battery conditioning, when the battery conditioning function of the battery is operated, the display units of the AVNT system A and the communication terminal D output an activated state of the battery conditioning mode through displays. When the user does not want to execute battery conditioning because of a residual driving distance or for other reasons, the battery conditioning mode displayed as an AVNT menu may be released via several stage screens, but an action of operating the AVNT menu during driving causes a safety assurance problem. Therefore, addition of an operation of allowing the user to select activation of the battery conditioning mode through a pop-up window on the display unit of the AVNT system A when the vehicle enters the battery conditioning mode is may increase user convenience.

The battery conditioning mode setup state may comprise a predetermined setup state and a releasable setup state which may be set by the user in the AVNT system A of the vehicle. Further, when the controller B controls the temperature of the battery, the temperature of the battery may be controlled up to a temperature set by the battery conditioning mode settings.

The battery conditioning mode setup state means a state in which whether or not activation of the battery conditioning mode is set so as to control the temperature of the battery in inner settings of the vehicle. When the controller B determines that the battery conditioning entry condition information of the battery and the battery conditioning execution settings of the battery in the vehicle are received and thus executes battery conditioning, the controller B may control the battery heater F to be raised to a predetermined reference temperature so as to optimize charging performance of the battery. Therefore, it is necessary to raise the temperature of the battery by raising the battery heater F to the predetermined reference temperature in advance.

FIGS. 2 to 5 are views illustrating examples of setting screens displayed on the AVN system A and the communication terminal D in the system according to one exemplary embodiment of the present disclosure.

Referring to FIGS. 2 to 5, the system according to one exemplary embodiment of the present disclosure comprises the cluster C and the communication terminal D configured to receive the driving route information, the battery state information and the in-vehicle battery conditioning mode setup state information through the receivers A and E and then to display the received information.

The communication terminal D indicates a communication module (H/U TELE) shown in FIG. 1 and, in general, transmits information to a user smart device. The communication terminal D receives the entry condition information and the battery conditioning execution state information of the battery, and transmits the received entry condition information and the received battery conditioning execution state information of the battery to the vehicle or the user's terminal. Therefore, the user recognizes the entry condition information and the battery conditioning execution state of the battery displayed on the vehicle or the user's terminal through the communication terminal D, and performs an operation of raising the temperature of the battery so as to achieve active control when the user desires to charge the battery of the vehicle. When the corresponding function is operated, the operating state of the function is displayed on the application 40 of the user's smartphone, and thus, the user may confirm whether or not the corresponding operation of raising the temperature of the battery is normally turned on.

Figure 2:
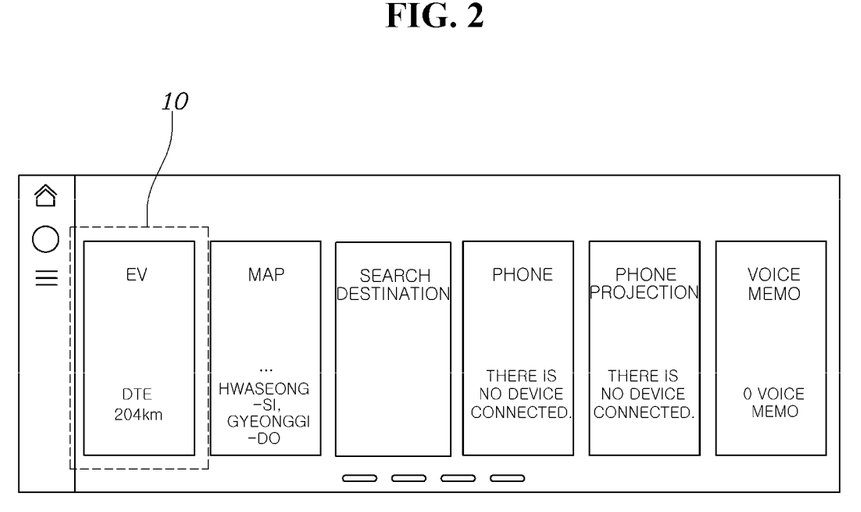
FIGS. 2 to 5 are views illustrating examples of setting screens displayed on an AVN system and a communication terminal in the system according to one exemplary embodiment of the present disclosure.
Figure 3:
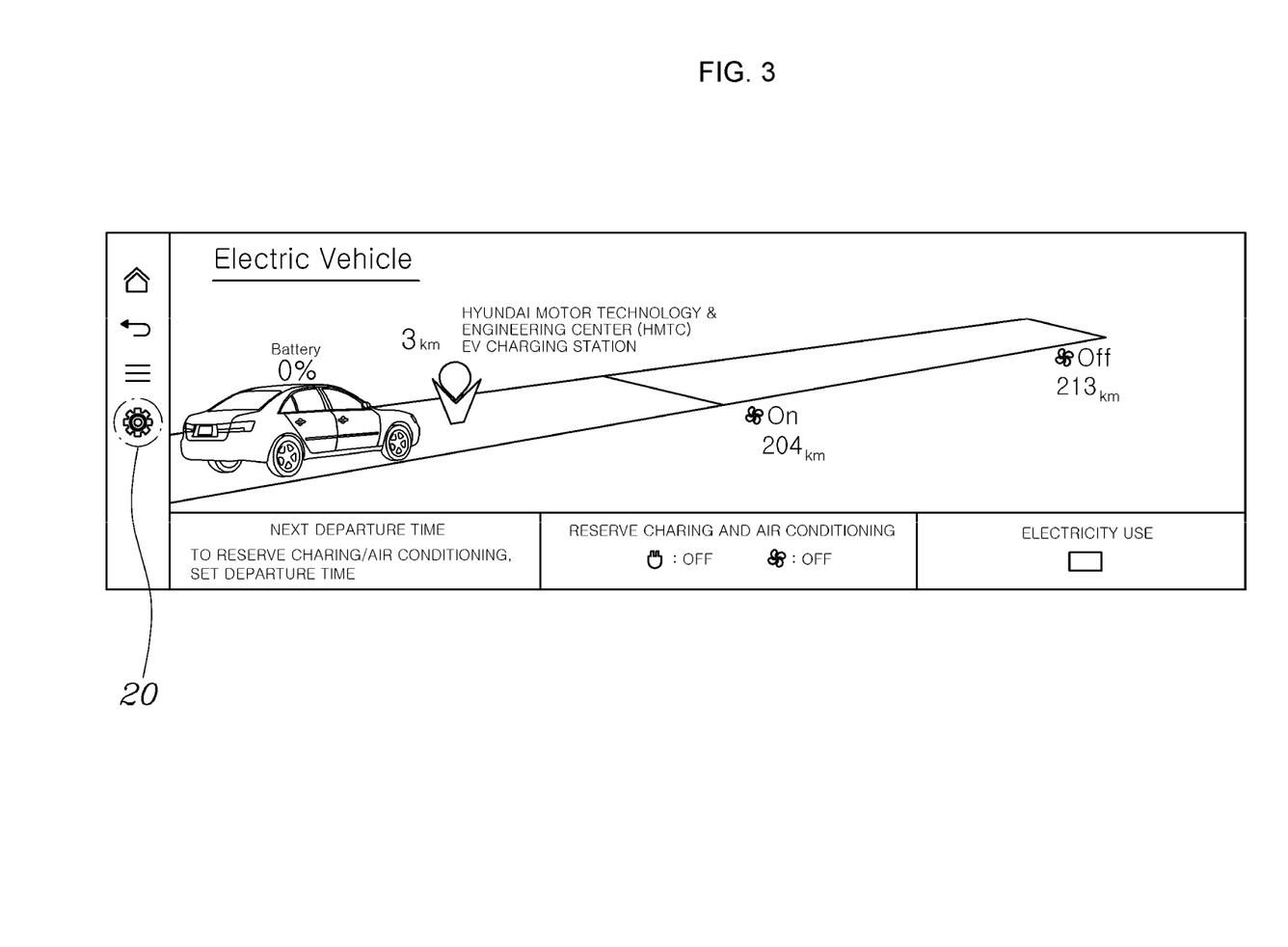
Figure 5:
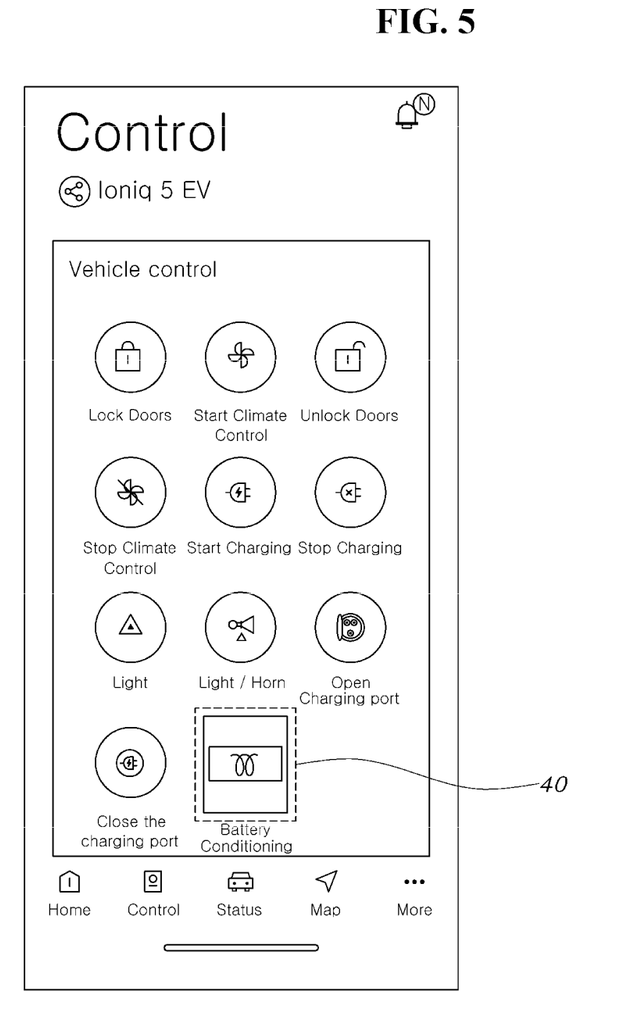
Figure 6:
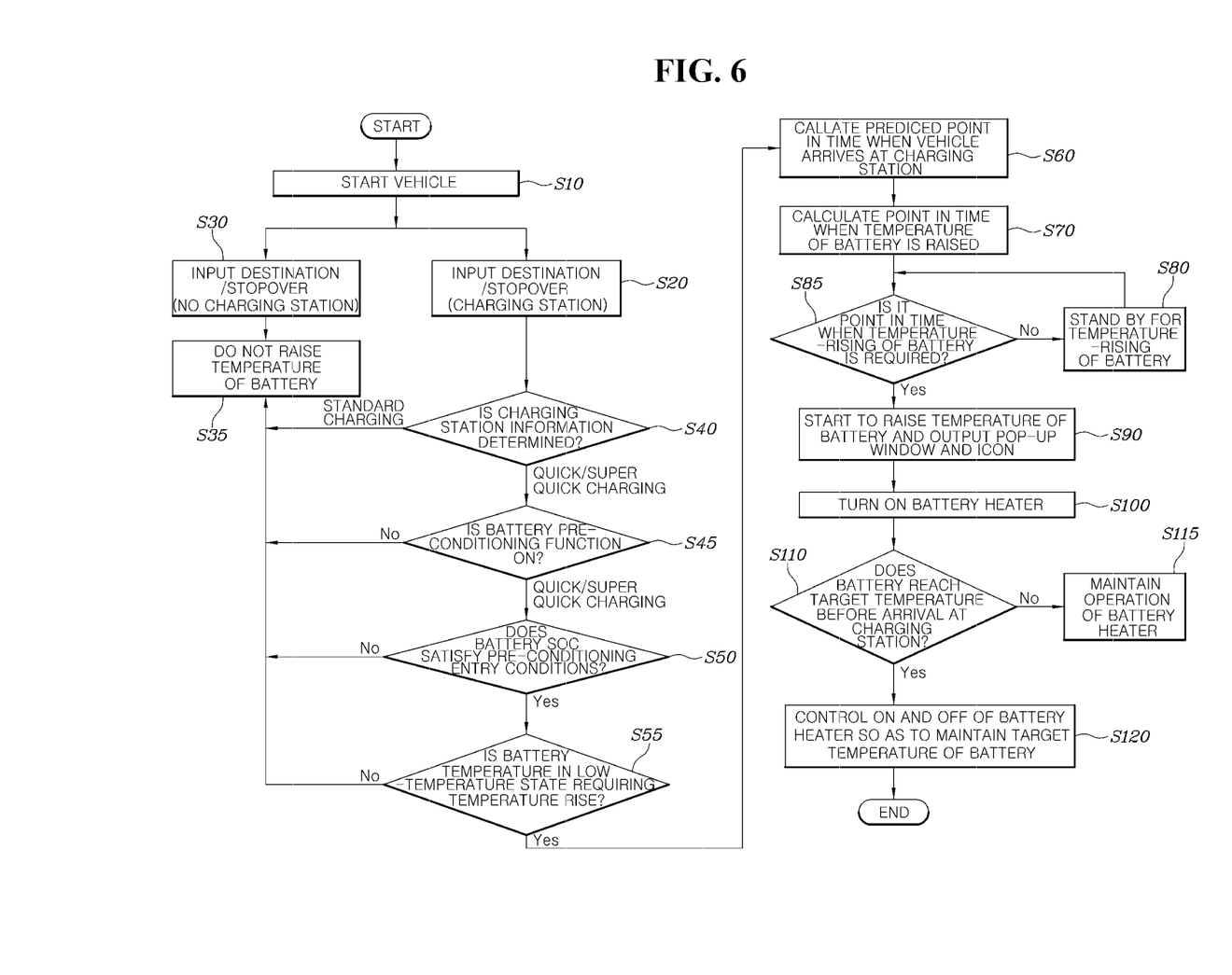
FIG. 6 is a flowchart representing a method for battery conditioning of a vehicle according to one exemplary embodiment of the present disclosure.

FIGS. 2 to 5 show the screens of the cluster C or the AVNT system A of the head unit of the vehicle, or the execution screen of the application 40 installed in the user's terminal. FIGS. 2 to 4 show a sequence 10, 20 and 30 of operations of executing battery conditioning displayed on the AVNT system A of the head unit of the vehicle, and FIG. 5 shows a notification of the battery conditioning state of the battery displayed on the application 40 installed in the user's smartphone. The AVNT system A of the head unit of the vehicle and the user's terminal interface with the controller B so as to execute battery conditioning in the state in which the AVNT system A and the user's terminal interwork with each other, and thereby, active control of the battery is possible.

The communication terminal D or the AVNT system A of the vehicle receives the battery conditioning mode setup state information through a pop-up window so as to enter the battery conditioning mode, and controls the temperature of the battery.

In another exemplary embodiment, technology which enables a vehicle to enter a battery conditioning mode reflecting real-time charging infrastructure information may be applied. When the vehicle receives information about the position of a charging station in a specific region as an actual destination and drives to the charging station while operating the battery conditioning mode, but is not capable of charge a batter at the corresponding charging station due to breakdown of the charging station, unnecessary energy of the battery is consumed in battery conditioning. Therefore, the battery conditioning function of the battery may be enhanced by reflecting real-time charging infrastructure information, such as types of charging stations (standard charging type/quick charging type/high output type)/ whether or not the charging stations are available (whether or not the charging stations break down, etc.), and GPS information. In this case, a user may be informed that the corresponding charging station is not available, and may be guided to set another charging station around the vehicle to a destination or to release the battery conditioning mode.

FIG. 6 is a flowchart representing a method for battery conditioning of a vehicle according to one exemplary embodiment of the present disclosure.

Referring to FIG. 6, the vehicle is started up (S10) and then receives a destination input by a user (S20 and S30). When the destination of the vehicle is not a charging station, battery conditioning of the vehicle is not performed (S30 and S35). When the destination or a stopover input by the user is a charging station, it is determined that the user desires to charge the vehicle and thus battery conditioning of the vehicle is enabled (S20).

When the charging station set to the destination allows the user to quickly charge the vehicle, it is determined that battery conditioning is necessary (S40). In the case of standard charging, a charging time is sufficient, and thus, the battery conditioning mode may be used only during quick charging so as to provide effective energy management of the vehicle.

Thereafter, battery state information and in-vehicle battery conditioning mode setup state information are received. Further, it is determined whether or not the vehicle satisfies control entry conditions based on driving route information, the battery state information and the in-vehicle battery conditioning mode setup state information (S45, S50 and S55). Thereafter, the temperature of the battery is controlled (S100).

When battery conditioning is necessary, a time taken for the vehicle to arrive at the charging station, i.e., a predicted point in time when the vehicle starts to charge the battery, is calculated (S60). Then, a necessary operating time taken to battery condition the battery is predicted (S70). Therefore, a point in time when the vehicle starts to execute battery conditioning may be calculated by subtracting the necessary operating time from the predicted point in time. The temperature adjuster stands by until this point in time (S80), and the vehicle starts to execute battery conditioning at the corresponding point in time (S90).

Detailed technical characteristics in each operation of the method for battery conditioning the battery of the vehicle according to the present disclosure are the same as or similar to the technical characteristics of the respective elements of the above-described system for battery conditioning the battery of the vehicle according to the present disclosure, and a detailed description thereof will thus be omitted.

In the control of the temperature of the battery (S100), the temperature of the battery is raised up to a reference temperature set based on battery conditioning execution settings.

Before the control of the temperature of the battery (S100), the driving route information, the battery state information and the in-vehicle battery conditioning mode setup state information are received, and are displayed through the communication terminal D (S90).

In the control of the temperature of the battery (S100), the actually measured temperature of the battery may be compared to the set reference temperature (S110), and the battery heater F provided on the battery heater may be controlled to be turned on and off based on the result of the comparison so that the battery maintains the reference temperature (S120).

In the control of the temperature of the battery (S100), the actually measured temperature of the battery may be compared to the set reference temperature (S110), and the battery heater F may be controlled to maintain the operation thereof when the actually measured temperature of the battery does not reach the reference temperature (S115).

As is apparent from the above description, a system and method for battery conditioning of a vehicle according to the present disclosure may greatly shorten the actual charging time of the battery by raising the temperature of the battery to the optimum temperature or cooling the battery in advance before charging the battery through interworking among GPS information received by the vehicle, driving information and the state information of the battery.

Although the preferred exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A system for battery conditioning of a vehicle, the system comprising:
receivers configured to collect driving route information of the vehicle, battery state information of the vehicle, and battery conditioning mode setup state information; and
a controller configured to:
determine whether or not to enter battery conditioning control based on the driving route information of the vehicle, the battery state information of the vehicle, and the battery conditioning mode setup state information received from the receivers, and
after determining to enter the battery conditioning control, control a battery temperature adjuster comprising a heater so as to adjust a temperature of the battery by heating in advance before charging the battery during the battery conditioning control;
determine a predetermined gap exists between a current battery temperature and a set battery temperature; and
adjust an amount of heat applied by the heater to adjust the current battery temperature based upon an amount of time that heat has been applied.

2. The system according to claim 1, wherein the driving route information comprises a destination, a stopover, or a moving path set in the vehicle, and the controller determines to enter the battery conditioning control when the destination, the stopover, or the moving path set in the vehicle comprises a charging station.

3. The system according to claim 1, wherein the controller determines to enter the battery conditioning control when a destination, a stopover or a moving path set in the vehicle comprises a charging station and it is determined that a quick charger is provided in the corresponding charging station.

4. The system according to claim 3, wherein the controller receives information as to whether or not the quick charger is provided in the corresponding battery station from a memory of the vehicle or an external information provider directly or through the receivers.

5. The system according to claim 1, wherein the battery state information comprises a temperature of the battery and a state of charge (SOC) of the battery, and the controller determines to enter the battery conditioning control when the temperature of the battery deviates from a set temperature and the SOC of the battery is equal to or greater than an SOC of the battery necessary to drive the vehicle and to operate the battery temperature adjuster.

6. The system according to claim 1, wherein, when it is determined to enters the battery conditioning control, the controller calculates a predicted point in time when the vehicle starts to charge the battery and a necessary operating time of the battery temperature adjuster, and starts to execute battery conditioning control of the battery at a point in time calculated by subtracting the necessary operating time from the predicted point in time.

7. The system according to claim 6, wherein the necessary operating time is a time taken for the battery to reach a set temperature by operating the battery temperature adjuster.

8. The system according to claim 6, wherein the controller adjusts operation of the battery temperature adjuster so that the battery maintains a set temperature when a temperature of the battery reaches the set temperature before the battery is charged after starting to execute the battery conditioning control of the battery.

9. A method for battery conditioning of a vehicle, the method comprising:
collecting, by receivers, driving route information of the vehicle, battery state information of the vehicle and battery conditioning mode setup state information;
determining, by a controller, to enter battery conditioning control based on the driving route information of the vehicle, the battery state information of the vehicle, and the battery conditioning mode setup state information; and
adjusting, by the controller after determining to enter the battery conditioning control, a temperature of the battery by heating in advance before charging the battery, by controlling a battery temperature adjuster comprising a heater during the battery conditioning control;
determining that a predetermined gap exists between a current battery temperature and a set battery temperature; and
adjusting an amount of heat applied by the heater to adjust the current battery temperature based upon an amount of time that heat has been applied.

10. The method according to claim 9, wherein:
the driving route information comprises a destination, a stopover or a moving path set in the vehicle; and
in the step of determining whether or not the vehicle enters the battery conditioning control, the controller determines to enter the battery conditioning control when the destination, the stopover or the moving path set in the vehicle comprises a charging station.

11. The method according to claim 9, wherein, in the step of determining whether or not to enter the battery conditioning control, the controller determines to enter the battery conditioning control when a destination, a stopover or a moving path set in the vehicle comprises a charging station and it is determined that a quick charger is provided in the corresponding charging station.

12. The method according to claim 9, wherein:
the battery state information comprises a temperature of the battery and a state of charge (SOC) of the battery; and
in the step of determining whether or not to enter the battery conditioning control, the controller determines to enter the battery conditioning control when the temperature of the battery deviates from a set temperature and the SOC of the battery is equal to or greater than an SOC of the battery necessary to drive the vehicle and to operate the battery temperature adjuster.

13. The method according to claim 9, wherein, in the step of adjusting the temperature of the battery in advance, the controller, when it is determined to enter the battery conditioning control, calculates a predicted point in time when the vehicle starts to charge the battery and a necessary operating time of the battery temperature adjuster, and starts to execute battery conditioning control of the battery at a point in time calculated by subtracting the necessary operating time from the predicted point in time.

14. A non-transitory computer readable recording medium having stored therein at least one program configured to be executed by at least one processor,
wherein the at least one program comprises commands configured to:
determine whether or not to enter battery conditioning control based on driving route information of the vehicle, battery state information of the vehicle, and battery conditioning mode setup state information, received by receivers of the vehicle, and
after determining to enter the battery conditioning control, control a battery temperature adjuster comprising a heater so as to adjust a temperature of the battery by heating in advance before charging the battery during the battery conditioning control;
determine that a predetermined gap exists between a current battery temperature and a set battery temperature; and
adjust an amount of heat applied by the heater to adjust the current battery temperature based upon an amount of time that heat has been applied.

* * * * *